United States Patent
Leonard

(10) Patent No.: US 10,280,920 B2
(45) Date of Patent: May 7, 2019

(54) PUMP FOR AN ADDITIVE

(71) Applicant: PLASTIC OMNIUM ADVANCED INNOVATION AND RESEARCH, Brussels (BE)

(72) Inventor: Stephane Leonard, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 116 days.

(21) Appl. No.: 15/039,659

(22) PCT Filed: Nov. 21, 2014

(86) PCT No.: PCT/EP2014/075259
§ 371 (c)(1),
(2) Date: May 26, 2016

(87) PCT Pub. No.: WO2015/078777
PCT Pub. Date: Jun. 4, 2015

(65) Prior Publication Data
US 2017/0335845 A1    Nov. 23, 2017

(30) Foreign Application Priority Data
Nov. 27, 2013  (FR) ..................... 13 61717

(51) Int. Cl.
*F04C 2/18* (2006.01)
*F01N 3/20* (2006.01)
*F04C 13/00* (2006.01)
(Continued)

(52) U.S. Cl.
CPC .............. *F04C 2/18* (2013.01); *F01N 3/2066* (2013.01); *F01N 3/2896* (2013.01);
(Continued)

(58) Field of Classification Search
CPC ...... F04C 2/18; F04C 13/0001; F04C 13/007; F04C 15/06; F04C 2210/1083;
(Continued)

(56) References Cited

U.S. PATENT DOCUMENTS 3,824,047 A * 7/1974 McDermott ............ F01C 1/103
418/171
4,968,233 A * 11/1990 Nakayoshi .............. F04C 2/102
418/166
(Continued)

FOREIGN PATENT DOCUMENTS

CN       1878652 A    12/2006
CN     103089612 A     5/2013
(Continued)

OTHER PUBLICATIONS

International Search Report dated Feb. 2, 2015, in PCT/EP2014/075259 filed Nov. 21, 2014.

*Primary Examiner* — Mary Davis
*Assistant Examiner* — Kelsey L Stanek
(74) *Attorney, Agent, or Firm* — Oblon, McClelland, Maier & Neustadt, L.L.P.

(57) ABSTRACT

The invention relates to a pump (2) intended to pump an additive in an SCR system for a vehicle. The pump is configured to rotate in a first direction of rotation in order to convey additive stored in a tank towards an injector via an injection channel. The pump includes a chamber (23) which houses a gear system (22). The chamber (23) is in fluid communication with the tank and the injection channel via an inlet channel (24) and an outlet channel (25) respectively. The pump is such that the inlet channel and the outlet channel are arranged so that after draining the injection channel, the chamber collects and retains the additive.

16 Claims, 5 Drawing Sheets

Figure 1:
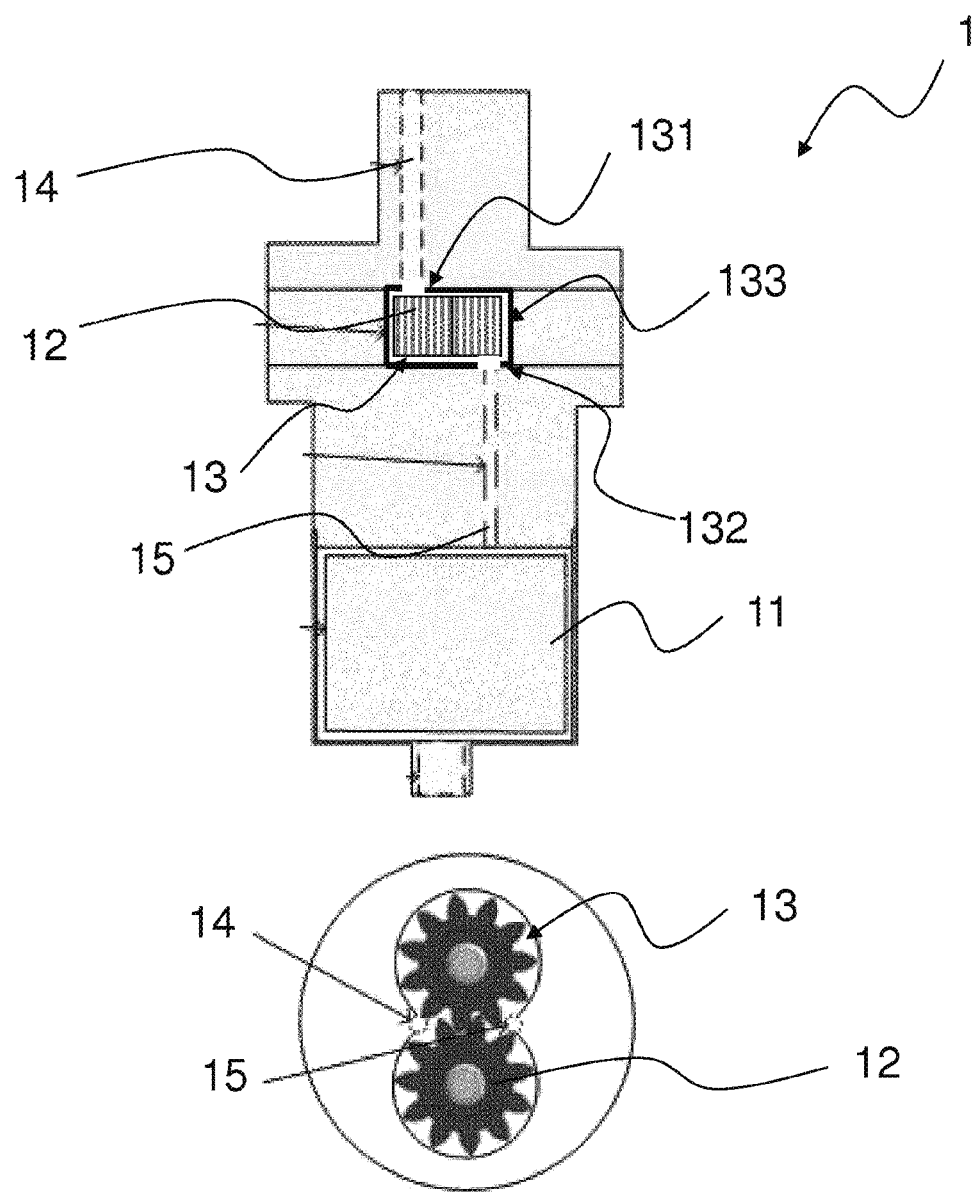

(51) Int. Cl.
*F04C 14/06* (2006.01)
*F04C 15/06* (2006.01)
*F01N 3/28* (2006.01)
*F04C 14/04* (2006.01)

(52) U.S. Cl.
CPC .......... *F04C 13/001* (2013.01); *F04C 13/005* (2013.01); *F04C 13/007* (2013.01); *F04C 14/06* (2013.01); *F04C 15/06* (2013.01); *F01N 2610/02* (2013.01); *F01N 2610/1413* (2013.01); *F01N 2610/1433* (2013.01); *F01N 2610/1453* (2013.01); *F01N 2610/1493* (2013.01); *F04C 14/04* (2013.01); *F04C 2210/1083* (2013.01); *F05C 2225/12* (2013.01)

(58) Field of Classification Search
CPC .. F01N 3/2066; F01N 3/2896; F01N 2610/02; F01N 2610/1413; F01N 2610/1433; F01N 2610/1453; F01N 2610/1493; F05C 2225/12
USPC .......... 60/301, 295, 296; 418/206.1
See application file for complete search history.

(56) References Cited

U.S. PATENT DOCUMENTS

| | | | |
|---|---|---|---|
| 7,354,188 | B2 | 4/2008 | Uphus et al. |
| 2009/0194604 | A1* | 8/2009 | Smith ............ B05B 1/304 239/1 |
| 2009/0230136 | A1* | 9/2009 | Dougnier ........ F01N 3/2066 220/592.01 |
| 2010/0175369 | A1 | 7/2010 | Op De Beeck et al. |
| 2012/0047880 | A1 | 3/2012 | Leonard et al. |
| 2012/0224991 | A1* | 9/2012 | Lipinski ........ F04C 2/084 418/166 |
| 2013/0108484 | A1 | 5/2013 | Ryoo et al. |
| 2014/0079610 | A1 | 3/2014 | Op De Beeck et al. |

FOREIGN PATENT DOCUMENTS

| | | |
|---|---|---|
| DE | 10 2009 045 030 A1 | 3/2011 |
| EP | 2 538 082 A2 | 12/2012 |
| JP | 2012-21516 A | 2/2012 |
| WO | WO 2010/119116 A2 | 10/2010 |

* cited by examiner

PUMP FOR AN ADDITIVE

The present invention relates to a pump for a solution of an ammonia precursor. The present invention notably applies to a pump of the geared pump, vane pump or gerotor pump type.

Legislation governing heavy plant and vehicle emissions seeks, amongst other things, to reduce the emissions of nitrogen oxides $NO_x$ into the atmosphere. One known way of achieving this objective is to use SCR (selective catalytic reduction) which makes it possible to reduce the nitrogen oxides by injecting a reducing agent, generally ammonia, into the exhaust line. This ammonia may originate from the thermolytic decomposition of a solution of an ammonia precursor the concentration of which may be the eutectic concentration. Such an ammonia precursor is generally a solution of urea.

Using the SCR method, the high $NO_x$ emissions produced in the engine during combustion at optimized efficiency are treated after they leave the engine in a catalytic converter. This treatment requires the use of the reducing agent at a precise concentration level and of extreme quality. The solution is thus very precisely metered and injected into the stream of exhaust gases where it is hydrolyzed before converting the nitrogen oxides ($NO_x$) into nitrogen ($N_2$) and water ($H_2O$).

In order to achieve this, vehicles need to be fitted with a tank containing a solution of additive (generally urea) and a device (or injector) for metering and injecting the desired quantity of additive into the exhaust line. Generally, a feed device is used to convey the additive from the tank to the injector via an injection duct (or injection line).

In general, the feed device comprises a rotary pump driven by a motor.

For ease of operation and for restarting the system in the event of freezing and to prevent the pipes, which are often flexible hoses, carrying the additive (generally urea) from bursting, it is advantageous for the piping to be purged at the end of operation of the system. In particular, it is advantageous to purge the injection duct.

In general, the line or lines is or are purged by drawing air and/or exhaust gases through the injector using the rotary pump which, for that purpose, rotates in a direction that is the opposite to the direction used for feeding the injector.

FIG. 1 schematically illustrates one example of a known rotary pump for an SCR system.

The rotary pump 1 of FIG. 1 is configured to rotate in a first direction of rotation to convey additive stored in a tank to an injector via an injection duct, and in a second direction of rotation (the opposite to the first direction of rotation) in order to purge the injection duct. The rotary pump 1 comprises:

- a rotor 11 collaborating with a stator (which has not been depicted); and
- a chamber 13 in which a system of gears 12 is housed.

The chamber 13 is placed in fluidic communication with the tank and the injection duct via, respectively, an inlet duct 14 and an outlet duct 15. The inlet duct 14 is connected to the upper wall 131 of the chamber and the outlet duct 15 to the lower wall 132 of the chamber. The side wall 133 connects the upper wall 131 and the lower wall 132. Thus, the upper wall 131 of the chamber comprises a first orifice via which the inlet duct 14 can communicate with the inside of the chamber and the lower wall 132 of the chamber comprises a second orifice via which the outlet duct 15 may communicate with the inside of the chamber.

In general, after the purge has been performed, the chamber 13 is essentially full of air. As a result, the next startup of the system may prove difficult and lengthy. Thus, to facilitate this start it is generally proposed that the injector be opened at the beginning of the start. Now, this makes the injector control strategy more complicated. Moreover, an uncontrolled quantity of additive may be injected into the exhaust line when this line has not yet reached a high enough temperature to achieve the desired chemical reaction.

The present invention seeks to solve these problems.

Therefore, the present invention relates to a pump intended to pump an additive in a vehicle SCR system, the pump being configured to rotate in a first direction of rotation to convey additive stored in a tank to an injector via an injection duct, the pump comprising a chamber in which is housed a system of gears with small mechanical clearances between the gears and the chamber so as to limit as far as possible the internal leaks of the pump and the loss of efficiency. The chamber comprises an upper wall, a bottom wall and a side wall connecting the upper wall and the bottom wall, the chamber being placed in fluidic communication with the tank and the injection duct via, respectively, an inlet duct and an outlet duct. The pump is such that the inlet duct and the outlet duct are arranged in such a way that, after the injection duct has been purged, the chamber collects and holds some additive. The outlet duct is connected to the upper wall of the chamber or to the side wall of the chamber and at a non-zero distance away from the bottom wall.

Thus it is proposed for the outlet duct to be arranged on (i.e. connected to) the upper or side wall of the chamber at a predetermined and non-zero distance away from the bottom wall so that the chamber of the system of gears can be used as an additive trap. In other words, the outlet duct is arranged in such a way that the chamber holds a predetermined volume of additive after a purge.

More specifically, the chamber according to the invention is configured to collect and hold some additive after a purge of the injection duct (namely when the system is stopped). Specifically, connecting the outlet duct to the upper or side wall of the chamber at a non-zero distance away from the bottom wall makes it possible to prevent the residual additive from being completely drained away out of the chamber under the effect of gravity. In other words, the chamber of the invention comprises a bottom wall that has no opening via which the residual additive can leave the chamber under the effect of gravity.

Thus, the additive held makes it possible to improve the radial and axial sealing between the chamber and the rotary parts contained in the chamber. This is due to the fact that the viscosity of the additive held is higher than that of air.

The present invention notably applies to a pump of the geared pump, vane pump or gerotor pump type. For example, the gerotor pump comprises an internal gears system housed in a chamber. For example, the geared pump comprises an external gears system housed in a chamber.

Advantageously, the chamber is configured to hold and store residual additive originating from the inlet duct. In general, following a purge, the inlet duct contains residual additive (namely droplets of additive). This residue generally falls into the chamber of the system of gears under the effect of gravity and is then removed from the chamber via the outlet duct under the effect of gravity. The invention therefore proposes an opposite approach whereby this residual additive is held in the chamber. In order to do that, the inlet duct and the outlet duct are arranged with respect to the chamber in such a way that there is no path along which the residual additive can be completely drained out of the chamber under the effect of gravity. Thus, when the pump is stopped after a purge, the chamber is able to store additive.

The chamber according to the invention may be partially filled with additive.

As a preference, the chamber according to the invention is completely filled with additive. In this way, the system of gears can be completely immersed in additive. In other words, before the next starting of the system, the system of gears is immersed in additive. Such a configuration has the advantage of ensuring the system can easily be restarted, of making the drawing (pumping) of additive from the tank easier and of keeping the injector closed at the beginning of the start.

According to one particularly advantageous embodiment, the outlet duct comprises a siphon-form section connected to the upper wall or side wall of the chamber.

According to one particular embodiment, the inlet duct comprises a siphon-form section connected to the upper wall or side wall of the chamber.

Advantageously, the pump is configured to rotate in a second direction of rotation in order to purge the injection duct.

In one advantageous embodiment, the inlet duct comprises a buffer volume configured to hold some additive while the injection duct is being purged. Thus, this buffer volume constitutes a reserve of additive which is intended to fill the chamber of the system of gears at the end of purge (namely when the pump is stopped). In this way, it is possible to ensure that the chamber is always at least partially full of additive before the next starting of the system. Advantageously, the buffer volume is dimensioned so that during the purge it accumulates enough additive to completely fill the chamber.

For preference, the system of gears comprises at least two gears (toothed wheels) which, by rotating, allow additive to be pumped from the tank to the injection duct and allow additive in the injection duct to be drawn toward the tank. The gears of such a pump are preferably based on polymer and more particularly on a fiber-reinforced polymer such as carbon-fiber-reinforced PEEK.

The present invention also relates to a tank for an SCR system comprising an additive pump as described hereinabove.

The additive involved in the context of the invention is preferably a reducing agent capable of reducing NOx present in exhaust gases of internal combustion engines. It is advantageously ammonia used directly (which presents associated disadvantages of safety and corrosion) or generated in situ, in the exhaust gases, from a precursor such as urea (thereby avoiding the aforementioned disadvantages). The invention yields good results with urea and, in particular, with aqueous solutions of urea. Eutectic solutions (containing 32.5 wt % of urea) are particularly suitable.

The present invention can be applied to any internal combustion engine likely to generate NOx in its exhaust gases.

The system according to the invention comprises at least one tank intended to store the additive and at least one injection duct (or line) intended to convey the additive to an exhaust pipe of the engine. This duct is equipped at its end with an injector that allows additive to be injected into the exhaust gases.

The system according to the invention also comprises a pump for conveying the additive from the additive tank to the injector. This pump may be situated in the additive tank (with the advantage that it constitutes therewith a compact and integral module) or, bearing in mind the corrosive environment, may be situated outside the additive tank. The materials of which it is made will preferably be selected from metals that are resistant to corrosion (notably certain grades of stainless steel and polymers).

Usually, the system according to the invention comprises a computer connected to the injector and allowing the required quantity of additive (notably as a function of the following parameters: level of NOx emissions and conversion; temperature and pressure; engine speed and load, etc.) to be injected into the exhaust gases.

Figure 2:
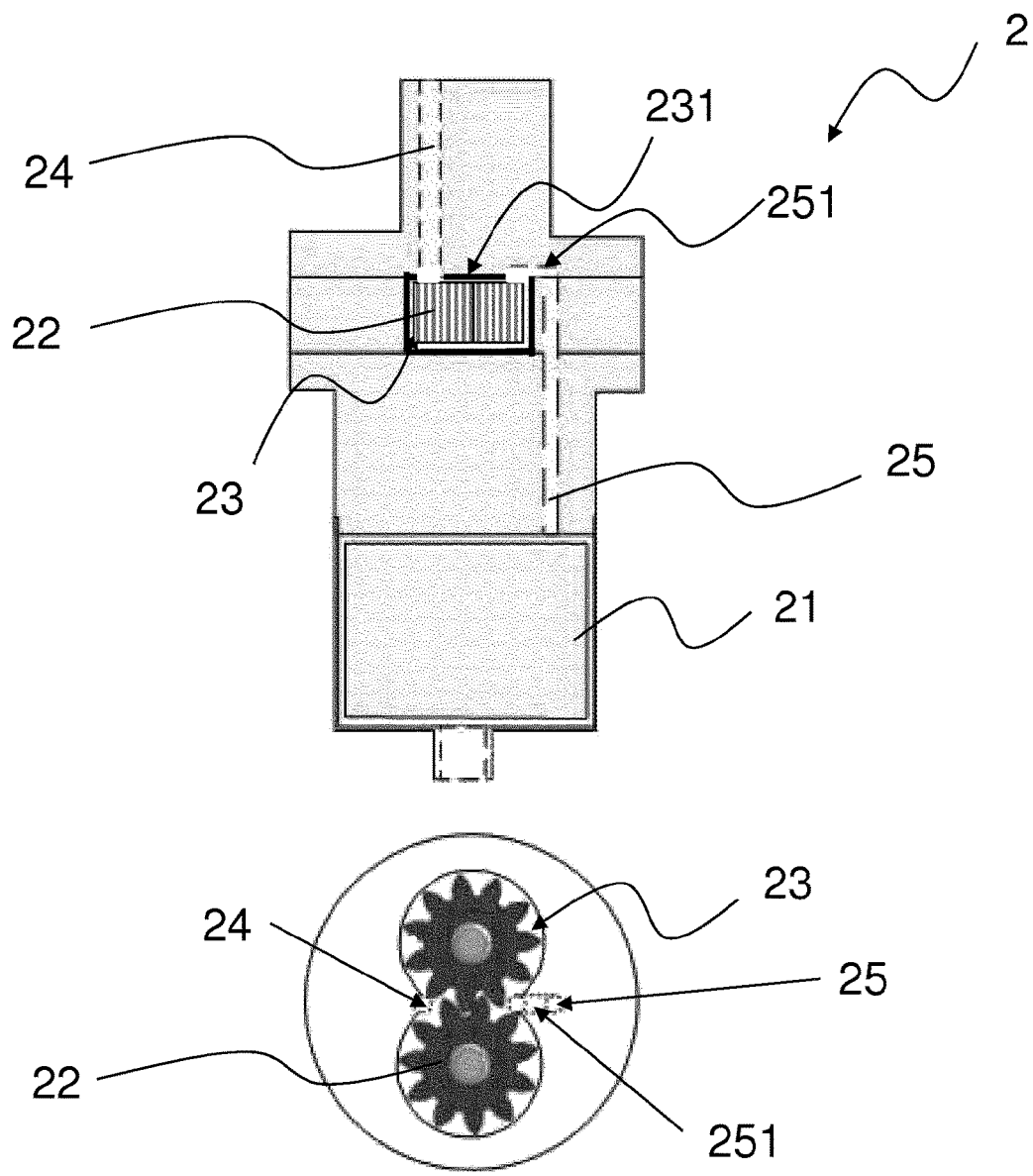
Figure 3:
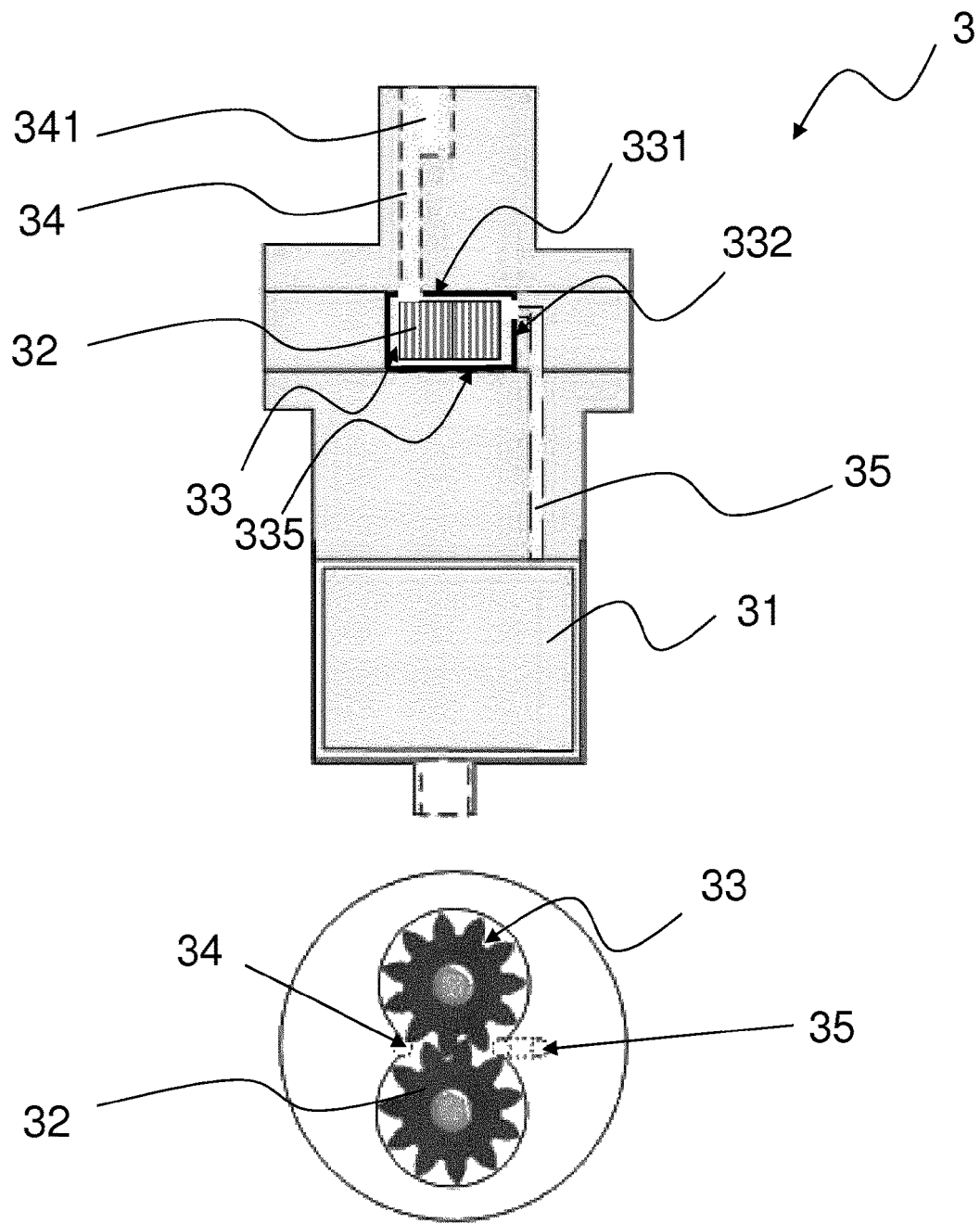
Figure 4:
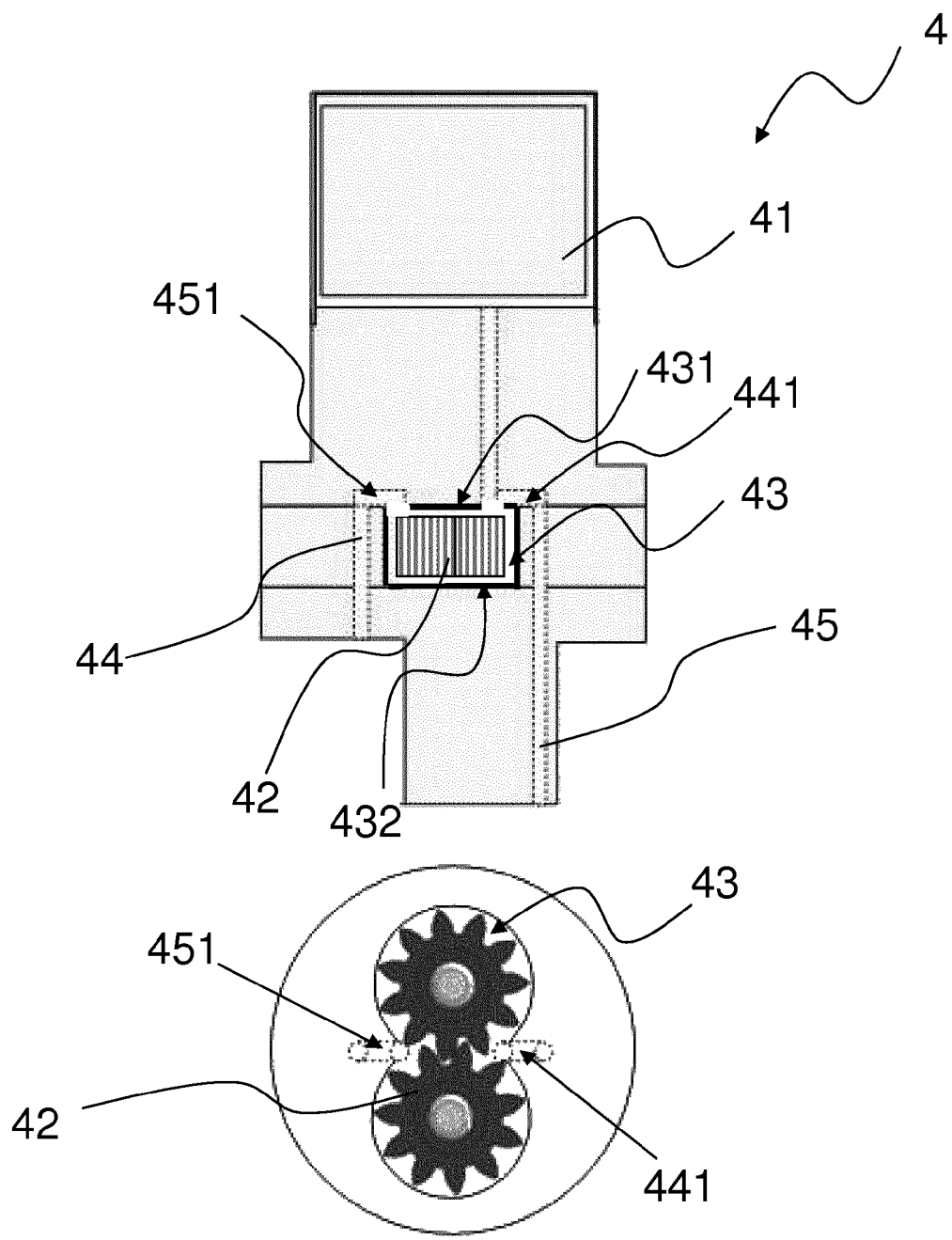

Further features and advantages of the invention will become apparent from reading the following description, which is given by way of nonlimiting indicative example and from studying the attached drawings, in which:

FIG. 1, already commented upon, schematically illustrates a known additive pump from the prior art;

FIG. 2 schematically illustrates an additive pump according to a first particular embodiment of the invention;

FIG. 3 schematically illustrates an additive pump according to a second particular embodiment of the invention; and FIG. 4 schematically illustrates an additive pump according to a third particular embodiment of the invention.

Figure 5:
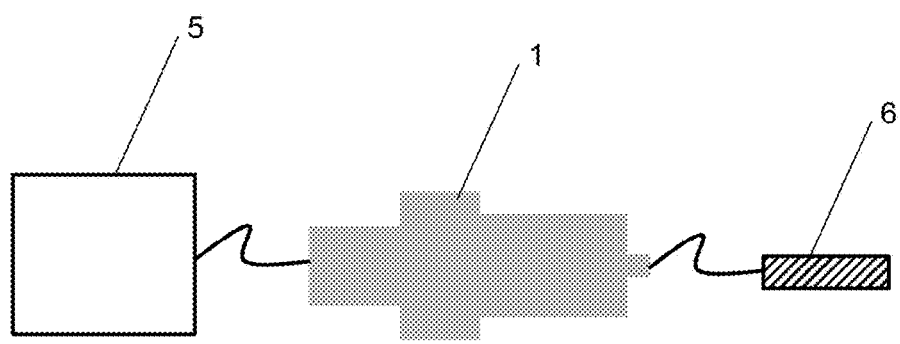

FIG. 5 schematically illustrates an exemplary embodiment where the additive pump 1 is external to additive tank 5 and conveys additive to an injector 6.

A first embodiment of an additive pump according to the invention is now described in relation to FIG. 2.

The pump 2 is configured to rotate in a first direction of rotation to convey additive stored in a tank to an injector via an injection duct, and in a second direction of rotation (the opposite of the first direction of rotation) to purge the injection duct. The pump 2 comprises:

a rotor 21 collaborating with a stator (which has not been depicted); and a chamber 23 in which a system of gears 22 is housed.

The chamber 23 is placed in fluidic communication with the tank and the injection duct via, respectively, an inlet duct 24 and an outlet duct 25.

In this first particular embodiment, the inlet duct 24 and the outlet duct 25 are connected to (mounted on) the upper wall 231 of the chamber. Thus, the upper wall 231 of the chamber comprises a first orifice via which the inlet duct 24 can communicate with the inside of the chamber, and a second orifice via which the outlet duct 25 can communicate with the inside of the chamber. The bottom wall of the chamber has no orifice. Thus, the additive can enter and leave the chamber only via the first and second orifices.

The outlet duct 25 comprises a siphon-form section 251. Such an architecture means, after the purge has been performed (i.e. with the pump stationary), that residual additive that drops under the effect of gravity from the inlet duct 24 becomes trapped in the chamber 23. Specifically, the position of the outlet duct 25 is such that it does not allow residual additive to completely escape from the chamber under the effect of gravity. This residual additive will be removed from the chamber by the system of gears 22 at the next starting of the system (i.e. with the pump running).

It will be noted that under conditions of freezing, the additive stored in the chamber 23 may freeze. Before restarting the pump (and therefore causing the system of gears to turn), it is advantageous for the additive stored in the chamber 23 to be liquefied (i.e. unfrozen). This can be done, for example, using a heating device placed in the tank. Moreover, an elegant strategy of preheating the pump may be applied by, for example, operating the coils of the pump to make them act as heating elements.

A second embodiment of an additive pump according to the invention is now described in relation to FIG. 3.

The pump 3 comprises:
- a rotor 31 collaborating with a stator (which has not been depicted); and
- a chamber 33 in which a system of gears 32 is housed.

The chamber 33 is placed in fluidic communication with the tank and the injection duct via, respectively, an inlet duct 34 and an outlet duct 35.

In this second particular embodiment, the inlet duct 34 is connected to (mounted on) the upper wall 331 of the chamber. The inlet duct 34 comprises a buffer volume 341 configured to hold some additive while the injection duct is being purged. Advantageously, the buffer volume 341 acts as a kind of liquid-vapor separator. More specifically, the hydraulic section of the buffer volume is great enough that air (drawn in by the injector) passing through this volume is a flow of air bubbles, as opposed to a plug flow which occurs in a volume with a hydraulic section less than or equal to the cross section of the air bubbles.

The outlet duct 35 is connected to (mounted on) the side wall 332 of the chamber in a region near (namely within a few millimeters of) the upper wall 331 of the chamber.

Thus, in this second particular embodiment, the upper wall 331 of the chamber comprises a first orifice via which the inlet duct 34 can communicate with the inside of the chamber and the side wall 332 of the chamber comprises a second orifice via which the outlet duct 35 can communicate with the inside of the chamber. The bottom wall 335 of the chamber has no orifice. Thus, additive can enter and leave the chamber only via the first and second orifices.

The side wall 332 connects the upper wall 331 and the bottom wall 335. As illustrated in this exemplary embodiment, the outlet duct 35 is arranged on the side wall 332 of the chamber at a predetermined and non-zero distance away from the bottom wall 335.

A third embodiment of an additive pump according to the invention is now described in relation to FIG. 4.

The pump 4 comprises:
- a rotor 41 collaborating with a stator (which has not been depicted); and
- a chamber 43 in which a system of gears 42 is housed.

The chamber 43 is placed in fluidic communication with the tank and the injection duct via, respectively, an inlet duct 44 and an outlet duct 45.

In this third particular embodiment, the inlet duct 44 and the outlet duct 45 are connected to (mounted on) the upper wall 431 of the chamber. Thus, the upper wall 431 of the chamber comprises a first orifice via which the inlet duct 44 can communicate with the inside of the chamber and a second orifice via which the outlet duct 45 can communicate with the inside of the chamber. The bottom wall 432 of the chamber has no orifice. Thus, the additive can enter and leave the chamber only via the first and second orifices.

The inlet duct 44 comprises a siphon-form section 441. The outlet duct 45 comprises a siphon-form section 451.

The invention claimed is:

1. A pump intended to pump an additive in a vehicle SCR system,
wherein the pump is configured to rotate in a first direction of rotation to convey additive stored in a tank to an injector via an injection duct,
the pump comprising
a chamber that houses a system of gears,
the chamber comprising
an upper wall,
a bottom wall and
a side wall connecting the upper wall and the bottom wall,
the chamber being placed in fluidic communication with the tank and the injection duct via, respectively, an inlet duct and an outlet duct,
wherein the inlet duct and the outlet duct are arranged in such a way that, after the injection duct has been purged via the outlet duct, the chamber collects and holds a portion of the additive, and in that the outlet duct comprises a siphon-form section and is arranged on and leaves through:
the upper wall of the chamber; or
the side wall of the chamber and at a non-zero distance away from the bottom wall.

2. The pump as claimed in claim 1, wherein the inlet duct comprises a siphon-form section connected to the upper wall or side wall of the chamber and at a non-zero distance away from the bottom wall.

3. The pump as claimed in claim 1, wherein the pump is configured to rotate in a second direction of rotation in order to purge the injection duct.

4. The pump as claimed in claim 1, wherein the inlet duct comprises a buffer volume configured to hold a portion of the additive while the injection duct is being purged.

5. The pump as claimed in claim 1, wherein the system of gears comprises at least two polymer-based gears.

6. The pump as claimed in claim 1, wherein the additive is an aqueous solution of urea.

7. The pump as claimed in claim 1, wherein the outlet duct is arranged on and leaves through the upper wall of the chamber.

8. The pump as claimed in claim 1, wherein the outlet duct is arranged on and leaves through the side wall of the chamber and at a non-zero distance away from the bottom wall.

9. A tank for an SCR system comprising a pump configured to rotate in a first direction of rotation to convey additive stored in the tank to an injector via an injection duct,
the pump comprising:
a chamber that houses a system of gears,
the chamber comprising:
an upper wall;
a bottom wall; and
a side wall connecting the upper wall and the bottom wall, the chamber being placed in fluidic communication with the tank and the injection duct via, respectively, an inlet duct and an outlet duct,
wherein the inlet duct and the outlet duct are arranged in such a way that, after the injection duct has been purged via the outlet duct, the chamber collects and holds a portion of the additive, and in that the outlet duct comprises a siphon-form section and is arranged on and leaves through:
the upper wall of the chamber; or
the side wall of the chamber and at a non-zero distance away from the bottom wall.

10. A pump intended to pump an additive in a vehicle SCR system,
wherein the pump is configured to rotate in a first direction of rotation to convey additive stored in a tank to an injector via an injection duct,
the pump comprising
a chamber that houses a system of gears,
the chamber comprising
an upper wall, a bottom wall and a side wall connecting the upper wall and the bottom wall, the chamber being placed in fluidic communication with the tank and the injection duct via, respectively, an inlet duct and an outlet duct, wherein the inlet duct and the outlet duct are arranged in such a way that, after the injection duct has been purged via the outlet duct, the chamber collects and holds a portion of the additive, and in that the outlet duct is arranged on and leaves through the side wall of the chamber and at a non-zero distance away from the bottom wall.

11. The pump as claimed in claim 10, wherein the inlet duct comprises a siphon-form section connected to the upper wall or side wall of the chamber and at a non-zero distance away from the bottom wall.

12. The pump as claimed in claim 10, wherein the pump is configured to rotate in a second direction of rotation in order to purge the injection duct.

13. The pump as claimed in claim 10, wherein the inlet duct comprises a buffer volume configured to hold a portion of the additive while the injection duct is being purged.

14. The pump as claimed in claim 10, wherein the system of gears comprises at least two polymer-based gears.

15. The pump as claimed in claim 10, wherein the additive is an aqueous solution of urea.

16. A tank for an SCR system comprising a pump configured to rotate in a first direction of rotation to convey additive stored in the tank to an injector via an injection duct, the pump comprising:

a chamber that houses a system of gears;

the chamber comprising:

an upper wall;

a bottom wall; and a side wall connecting the upper wall and the bottom wall, the chamber being placed in fluidic communication with the tank and the injection duct via, respectively, an inlet duct and an outlet duct, wherein the inlet duct and the outlet duct are arranged in such a way that, after the injection duct has been purged via the outlet duct, the chamber collects and holds a portion of the additive, and in that the outlet duct is arranged on and leaves through the side wall of the chamber and at a non-zero distance away from the bottom wall.

\* \* \* \* \*